(12) United States Patent
Mirsky et al.

(10) Patent No.: US 11,509,561 B2
(45) Date of Patent: Nov. 22, 2022

(54) PERFORMANCE MEASUREMENT USING EXTENDED BIDIRECTIONAL FORWARDING CONTROL PACKET

(71) Applicant: ZTE Corporation, Guangdong (CN)

(72) Inventors: Gregory Mirsky, Pleasanton, CA (US); Min Xiao, Guangdong (CN)

(73) Assignee: ZTE Corporation, Guangdong (CN)

( * ) Notice: Subject to any disclaimer, the term of this patent is extended or adjusted under 35 U.S.C. 154(b) by 10 days.

(21) Appl. No.: 17/152,062

(22) Filed: Jan. 19, 2021

(65) Prior Publication Data

US 2021/0144078 A1  May 13, 2021

Related U.S. Application Data

(63) Continuation of application No. PCT/CN2019/075808, filed on Feb. 22, 2019.

(51) Int. Cl.
*H04L 43/10* (2022.01)
*H04L 43/0829* (2022.01)
*H04L 43/0852* (2022.01)

(52) U.S. Cl.
CPC .......... *H04L 43/10* (2013.01); *H04L 43/0829* (2013.01); *H04L 43/0858* (2013.01)

(58) Field of Classification Search
CPC . H04L 43/10; H04L 43/0829; H04L 43/0858; H04L 45/70; H04L 69/166
See application file for complete search history.

(56) References Cited

U.S. PATENT DOCUMENTS

| 9,258,234 B1* | 2/2016 | Addepalli | H04L 47/12 |
| 2008/0008168 A1 | 1/2008 | Nadeau et al. | |
| 2016/0036695 A1 | 2/2016 | Mirsky et al. | |
| 2017/0302547 A1* | 10/2017 | Wang | H04L 45/28 |
| 2017/0346709 A1* | 11/2017 | Menon | H04L 45/70 |
| 2018/0198723 A1* | 7/2018 | Attarwala | H04L 47/36 |

FOREIGN PATENT DOCUMENTS

| CN | 101848114 A | 9/2010 |
| CN | 101237452 | 4/2012 |
| CN | 107210947 | 9/2017 |
| CN | 107547383 | 1/2018 |

(Continued)

OTHER PUBLICATIONS

Internet Engineering Task Force (IETF), Request for Comments: 5880; Bidirectional Forwarding Detection (BFD), Jun. 2010 (Year: 2010).*

(Continued)

*Primary Examiner* — Brian Whipple
*Assistant Examiner* — James Ross Hollister
(74) *Attorney, Agent, or Firm* — Perkins Coie LLP

(57) ABSTRACT

Techniques are described for generating and using an extended Bi-directional Forwarding Detection (BFD) control packet in a network. The extended BFD control packet includes a control message that includes a BFD session information, an identifier associated with the device sending the BFD control packet, and a payload part. The extended BFD control packet may be used to perform packet loss and/or packet delay related measurements.

20 Claims, 14 Drawing Sheets

| Vers | Diag | Sta | P | F | Length |
|---|---|---|---|---|---|
| My Discriminator ||||||
| Your Discriminator ||||||
| Desired Min TX Interval ||||||
| Required Min RX Interval ||||||
| Required Min Echo RX Interval ||||||

(56) References Cited

FOREIGN PATENT DOCUMENTS

CN       108173718 A      6/2018
KR     20160131532 A   *  11/2016

OTHER PUBLICATIONS

IP Office, China PRC, International Search Report and Written Opinion for PCT/CN2019/075808, dated Nov. 13, 2019.
IEEE Std 1588-2008 IEEE Standard for a Precision Clock Synchronization Protocol for Networked Measurement and Control Systems, Jul. 2008.
Internet Engineering Task Force (IETF), Request for Comments: 5880; Bidirectional Forwarding Detection (BFD), Jun. 2010.
Internet Engineering Task Force (IETF), Request for Comments: 5881; Bidirectional Forwarding Detection( BFD) for IPv4 and IPv6 (Single Hop), Jun. 2010.
Internet Engineering Task Force (IETF), Request for Comments: 6374; Packet Loss and Delay Measurement for MPLS Networks, Sep. 2011.
RIFT Working Group, Internet-Draft, Routing in Fat Trees, Jun. 21, 2018.
Co-Pending Chinese Application No. 201980053377.4, Office Action dated Apr. 29, 2022, 22 pages with unofficial translation.
Katz, et al., "Bidirectional Forwarding Detection," The Internet Society, IEEE Jun. 2003, 25 pages.

* cited by examiner

| Vers | Diag | Sta | P | F | Length |
|---|---|---|---|---|---|
| My Discriminator ||||||
| Your Discriminator ||||||
| Desired Min TX Interval ||||||
| Required Min RX Interval ||||||
| Required Min Echo RX Interval ||||||

PERFORMANCE MEASUREMENT USING EXTENDED BIDIRECTIONAL FORWARDING CONTROL PACKET

CROSS-REFERENCE TO RELATED APPLICATIONS

This patent document is a continuation of and claims priority to International Patent Application No. PCT/CN2019/075808, filed Feb. 22, 2019. The entire content of the before-mentioned patent application is incorporated by reference as part of the disclosure of this application.

TECHNICAL FIELD

This disclosure is directed generally to packet data communications networks.

BACKGROUND

Zero-touch provisioning (ZTP) is the paradigm that supports the buildup of the modern hyper-scale networks, for example, data centers or exchange points. Using ZTP, devices can be automatically provisioned and configured. In some cases, ZTP allows for provisioning of devices on a network using minimum manual configuration of such devices. Thus, ZTP can be considered to introduce plug-and-play methodology to modern networking.

SUMMARY

Techniques are disclosed for generating and using an extended Bi-directional Forwarding Detection (BFD) control packet in a network.

A first exemplary packet communication method includes generating, by a first device, a first packet for transmission to a second device, where the second device is configured to provide network performance information; and sending the packet by the first device to the second device. The first packet includes: a first control message including a first bi-directional forwarding detection (BFD) session information, where the first control message includes a poll value that indicates that the first device is expecting to receive a packet from the second device, a first identifier associated with the first device, and a first payload part.

In some embodiments, the first exemplary method further includes receiving, by the first device after sending the first packet, a second packet from the second device, where the second packet includes: a second control message including a second BFD session information, where the second control message includes a final flag value that indicates that the second packet is sent in response to the first packet, a second identifier associated with the second device, and a second payload part; and determining, after receiving the second packet, that the second device is configured to provide network performance information using one or more additional packets that belong to a packet type comprising the first and second packets.

In some embodiments of the first exemplary method the determining that the second device is configured to provide network performance information using one or more additional packets comprises: determining that a first length of the second packet exceeds a sum of a second length of a header of the second packet and a third length of the second control message; or determining that the second packet includes the final flag value; or determining that the second packet includes the second identifier. In some embodiments of the first exemplary method, a length of each of the first identifier and the second identifier is four octets. In some embodiments of the first exemplary method, the first identifier is a first pre-determined value, and where the second identifier is a second pre-determined value.

In some embodiments, the first exemplary method further includes sending, by the first device to the second device and after receiving the second packet, a third packet that includes a third control message including a third BFD session information, where the third control message includes a second poll value, the first identifier, and a third payload part, where the third payload part includes information to request a packet loss measurement and a delay measurement to be performed by the second device; sending, by the first device to the second device, a fourth packet that includes: the first control message, the first identifier, and a fourth payload part, where the fourth payload part includes a query to obtain the packet loss measurement and the delay measurement; and receiving, by the first device and after sending the third and fourth packets, a fifth packet from the second device, where the fifth packet includes: the second control message, the second identifier, and a fifth payload part, where the fifth payload part includes measurement values associated with packet loss, one-way packet delay, and inter-packet delay variation.

In some embodiments, the first exemplary method further includes sending, by the first device to the second device and after receiving the second packet, a third packet that includes: the first control message, the first identifier, and a third payload part, where the third payload part includes the poll value, and where the third payload part includes information to request a packet loss measurement and a delay measurement to be performed by the second device; receiving, by the first device and after sending the third packet, a fourth packet from the second device, where the fourth packet includes: the second control message, the second identifier, and a fourth payload part, where the fourth payload part includes a first time when the second device receives the third packet and a second time when the second device transmits the fourth message; and determining, by the first device and based on the fourth packet, measurement values associated with round-trip packet loss, packet loss, one-way packet delay, and inter-packet delay variation.

In some embodiments of the first exemplary method, the first payload part, the second payload part, the third payload part, the fourth payload part, or the fifth payload part are formatted in a type-length-value (TLV) format.

In some embodiments of the first exemplary method, the first payload part is formatted in a type-length-value (TLV) format associated with a padding technique, the first payload part includes a field whose value corresponds to a number of octets, a length of the first packet is equal to a first link maximum transmission unit (MTU) value, the first device, after receiving the second packet, performs: sending to the second device a third packet that includes: the first control message, the first identifier, and a third payload part formatted in the TLV format associated with the padding technique, where the third payload part includes the poll value, and where the third payload part includes a value field that includes a pre-determined number of octets added to the number of octets; and in response to determining an absence of a reception of a packet from the second device after sending the third packet, determining that an actual link MTU value is the first link MTU value.

In some embodiments, the first exemplary method further includes starting a timer, by the first device, when the first packet is sent; determining an absence of a reception of a second packet from the second device before an expiration of the timer, where the second packet belongs to a packet type comprising the first packet; and determining, after the determining of the absence of the second packet, that the second device is unable to provide network performance information using one or more additional packets that belong to the packet type.

A second exemplary packet communication method comprises receiving, by a second device a first packet from a first device, where the second device is configured to provide network performance information. The first packet includes: a first control message including a first bi-directional forwarding detection (BFD) session information, where the first control message includes a poll value that indicates that the first device is expecting to receive a packet from the second device, a first identifier associated with the first device, and a first payload part. The second exemplary method also includes sending by the second device to the first device a second packet in response to receiving the first packet, where the second packet includes: a second control message including a second BFD session information, where the second control message includes a final flag value that indicates that the second packet is sent in response to the first packet, a second identifier associated with the second device, and a second payload part.

In some embodiments of the second exemplary method a length of each of the first identifier and the second identifier is four octets. In some embodiments of the second exemplary method, the first identifier is a first pre-determined value, and where the second identifier is a second pre-determined value.

In some embodiments, the second exemplary method further includes receiving, by the second device from the first device and after sending the second packet, a third packet that includes: a third control message including a third BFD session information, where the third control message includes a second poll value, the first identifier, and a third payload part, where the third payload part includes information to request a packet loss measurement and a delay measurement to be performed by the second device; receiving, by the second device from the first device, a fourth packet that includes: the first control message, the first identifier, and a fourth payload part, where the fourth payload part includes a query to obtain the packet loss measurement and the delay measurement; and sending, by the second device to the first device and after receiving the third and fourth packet, a fifth packet, where the fifth packet includes: the second control message, the second identifier, and a fifth payload part, where the fifth payload part includes measurement values associated with packet loss, one-way packet delay, and inter-packet delay variation.

In some embodiments, the second exemplary method further includes receiving, by the second device from the first device and after sending the second packet, a third packet that includes: the first control message, the first identifier, and a third payload part, where the third payload part includes the poll value, and where the third payload part includes information to request a packet loss measurement and a delay measurement to be performed by the second device; sending, by the second device to the first device and after receiving the third packet, a fourth packet, where the fourth packet includes: the second control message, the second identifier, and a fourth payload part, where the fourth payload part includes a first time when the second device receives the third packet and a second time when the second device transmits the fourth message.

In some embodiments of the second exemplary method, the first payload part, the second payload part, the third payload part, the fourth payload part, or the fifth payload part are formatted in a type-length-value (TLV) format.

In some embodiments of the second exemplary method, the first payload part is formatted in a type-length-value (TLV) format associated with a padding technique, the first payload part includes a field whose value corresponds to a number of octets, a length of the first packet is equal to a first link maximum transmission unit (MTU) value, the second device, after sending the second packet, performs: receiving from the first device a third packet that includes: the first control message, the first identifier, and a third payload part formatted in the TLV format associated with the padding technique, where the third payload part includes the poll value, and where the third payload part includes a value field that includes a pre-determined number of octets added to the number of octets; and determining, by the second device, a lack of transmission of another packet to the first device in response to determining that the third packet is erroneous or corrupted.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 1 shows a format for some fields of a Bi-directional Forwarding Detection (BFD) control packet.

FIG. 8C shows an example of some of the fields of a combined message format for a packet loss and delay measurements.

DETAILED DESCRIPTION

Figure 2:
FIG. 2 shows an exemplary format for an extended BFD control packet.

The example headings for the various sections below are used to facilitate the understanding of the disclosed subject matter and do not limit the scope of the claimed subject matter in any way. Accordingly, one or more features of one example section can be combined with one or more features of another example section. Section 1 first provides a general description of the current state of Bi-directional Forwarding Detection (BFD) and Zero-touch provisioning (ZTP) technology. Section II describes an exemplary extended BFD control packet that can overcome at least some of the technical issues identified in Section I.

I. Current State of BFD and ZTP Technology

Due to the explosive growth of the number of networking devices that comprise a network, it is almost impossible to manually configure each and every device before its activation. Thus, there is a need to develop procedures and protocols that, with only minimal initial information and using previously known information about the network topology, use auto-discovery and automatic propagation of network configuration. In some cases, such network configuration techniques without more operator involvement can lead to a problem known as blackholing, where a second device that receives packets from a first device drops the received packets without informing the first device that the packets have not been sent to the intended recipient of the packets. To avoid blackholing the user traffic because of misconfiguration, ZTP requires the use of the Service Activation Testing (SAT) procedures. SAT, as part of the broader Operations, Administration, and Maintenance (OAM) toolset, includes continuity check (CC), connectivity verification (CV) and performance measurement (PM) methods. SAT operates using only the information available and discovered as part of ZTP process.

A protocol known as Routing in Fat Trees (RIFT) supports ZTP and use of BFD as CC or CV component of SAT. BFD technology uses a BFD control packet that is further described in FIG. 1 below. RIFT protocol assigns to a device's link an identifier that can be used as My Discriminator value (described in FIG. 1) by the BFD system on a router. However, BFD only detects a failure on the link under test, not the low quality or quality degradation of the link. The latter condition can affect services and applications by causing excessive packet loss that will trigger retransmissions, thus reducing effective bandwidth. If the PM is part of SAT or used as a lightweight addition to BFD, deterioration of the link quality can be detected well before it is determined as failed and services can be re-routed.

FIG. 1 shows a format for some fields of a BFD control packet. The BFD control packet can include information for establishing a BFD session between two devices. The Vers field indicates the version number of the protocol. The Diag field refers to a diagnostic code specifying the local system's or device's reason for the last change in session state. The Sta field indicates a current BFD session state as seen by the transmitting device. For example, a value of 1 in the Sta field corresponds to a Down state and a value of 3 corresponds to an Up state. The Poll field (P) can be set to a pre-determined value (e.g., 1) by a transmitting device to indicate that the transmitting device is requesting verification of connectivity, or of a parameter change, and is expecting a packet with the Final field (F) bit in a reply packet. If the Poll field (P) is clear, then the transmitting system is not requesting verification.

The Final field (F) if set by a transmitting device, indicates that the transmitting device is responding to a received BFD Control packet that had the Poll (P) bit set. If the Final field (F) is clear, then the transmitting device is not responding to a Poll. The Length field indicates the length of the BFD Control packet, in bytes. The My Discriminator field includes a unique, nonzero discriminator value generated by a transmitting device that can be used to demultiplex multiple BFD sessions between the same pair of systems. The Your Discriminator field includes a discriminator value unique for the corresponding remote BFD system. The Your Discriminator field can reflect back the received value of My Discriminator or it may be zero if unknown.

The Desired Min TX Interval field includes a value that is the minimum interval, in microseconds, that a device would like to use when transmitting BFD Control packets, less any jitter applied. The Required Min RX Interval field includes a value that is the minimum interval, in microseconds, between received BFD Control packets that a device is capable of supporting, less any jitter applied by the sending device. If the Required Min RX Interval field value is zero, the transmitting device does not want the remote system to send any periodic BFD Control packets. The Required Min Echo RX Interval field includes a value that is the minimum interval, in microseconds, between received BFD Echo packets that a device is capable of supporting, less any jitter applied by a sending device. If the Required Min Echo RX Interval field value is zero, the transmitting device does not support the receipt of BFD Echo packets.

A BFD session begins when a device transmits BFD Control packets to another device. When bidirectional communication is achieved, the BFD session is considered to be in an Up state. BFD related technology is further described in Request for Comment (RFC) 5880 and RFC 5881 by Internet Engineering Task Force (IETF).

II. Exemplary Extended BFD Control Packet

FIG. 2 shows an exemplary format for an extended BFD control packet. The extended BFD control packet 200 includes a BFD control message 202, a guard word 204, and a payload part 206. The BFD Control message 202 may include at least some of the information associated with the BFD control packet, as described in FIG. 1.

The guard word 204 can be four octets long and can identify a device that sent or that generated the extended BFD control packet. The guard word can be a fixed pre-determined value that is not negotiated or is not dynamically assigned between two devices. For example, a first guard word can be associated with a device that is considered a "sender" of the extended BFD control packet and a second different guard word can be associated with a device that is considered a "responder" of the extended BFD control packet. The sender device can also receive an extended BFD control packet sent by the responder device, where the extended BFD control packet would include the second guard word associated with the responder device.

Figure 3:
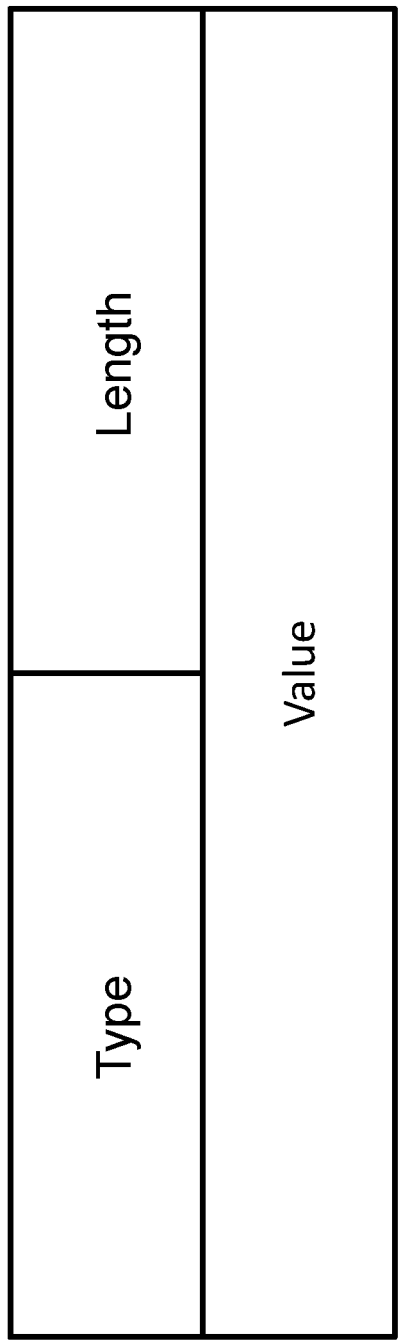
FIG. 3 shows a type-length-value format for a payload.

The payload part 206 may include one or more blocks of data formatted as Type-Length-Value (TLV) as shown in FIG. 3. A TLV, in turn, may include sub-TLVs.

In a BFD system, a sender device can verify that its peer responder device is capable using the extended BFD control packet using the techniques described in this patent document. The extended BFD control packet can be encapsulated in an Internet Protocol (IP)/user datagram protocol (UDP) at least because BFD systems may use UDP as transport protocol. For example, the sender device can transmit the extended BFD control packet in IP/UDP encapsulation and can set the destination UDP port value to 3784 and the source UDP port number can be set according to IETF RFC 5881. The Poll flag in the BFD control packet can be set to a pre-determined value (e.g., 1) as part of a Poll sequence (as described in FIG. 1), and the guard word is set to the fixed pre-determined value associated with the sender device. By setting the Poll flag to a pre-determined value (e.g., 1), the sender device indicates to the responder device that the sender device is expecting to receive a packet from the responder device. The value of the length field of the IP header can include the length of the guard word and the payload part.

Figure 4:
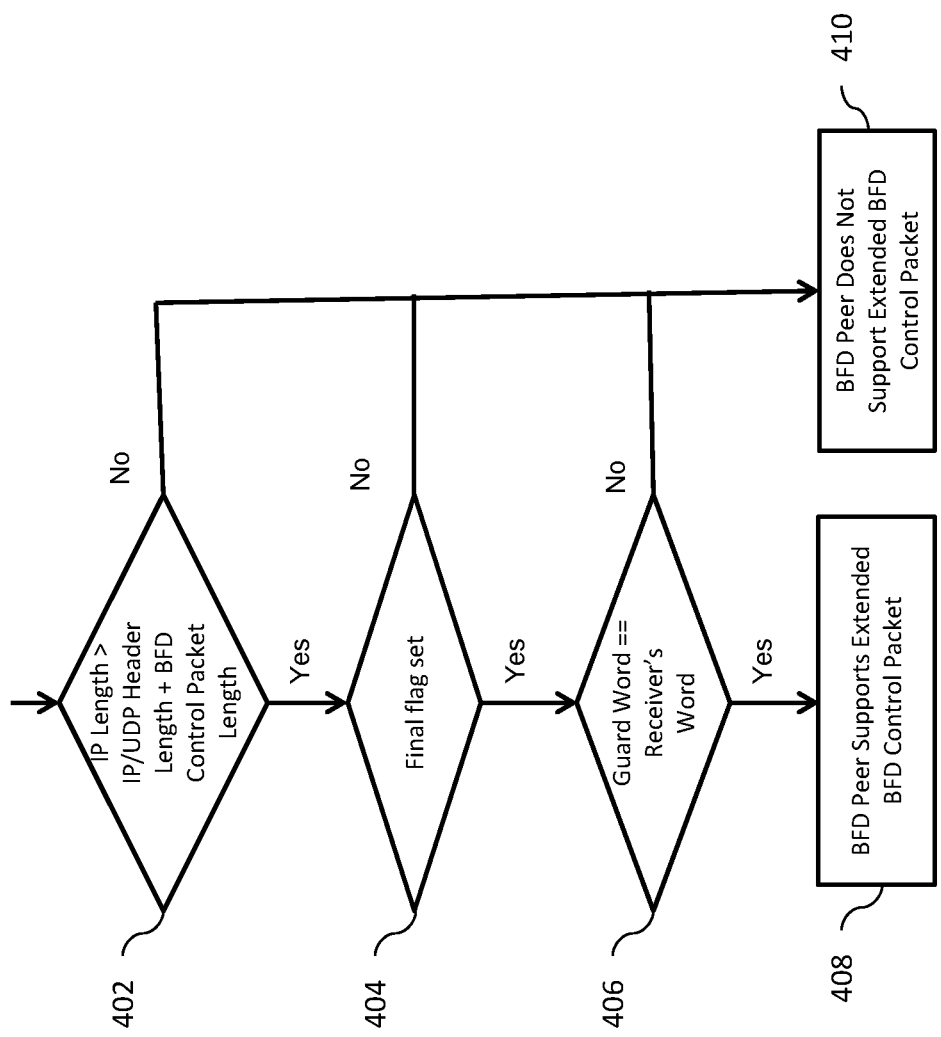
FIG. 4 shows an exemplary flow diagram for a sender device to determine whether a responder device supports the extended BFD control packet.

FIG. 4 shows an exemplary flow diagram for a sender device to determine whether a responder device supports the extended BFD control packet. Prior to operation 402, the sender device generates and/or sends a first extended BFD packet with the Poll flag set. Because the Poll flag is set, the sender device can expect a response from the remote BFD system (e.g., a responder device). Thus, upon transmission of a first extended BFD control packet, the sender device waits for a response from the responder device. If the responder device supports the use of an extended BFD Control packet, it can respond with a second extended BFD control packet generated in IP/UDP encapsulation. In the second extended BFD control packet, the responder device can set the Final flag in the BFD control packet (as described in FIG. 1), and the value of the guard word is associated with the responder device. A value for the Final flag is included in the BFD control packet and it indicates that the responder device has sent the second extended BFD Control packet in response to the first extended BFD Control packet sent by the sender device.

Figure 10:
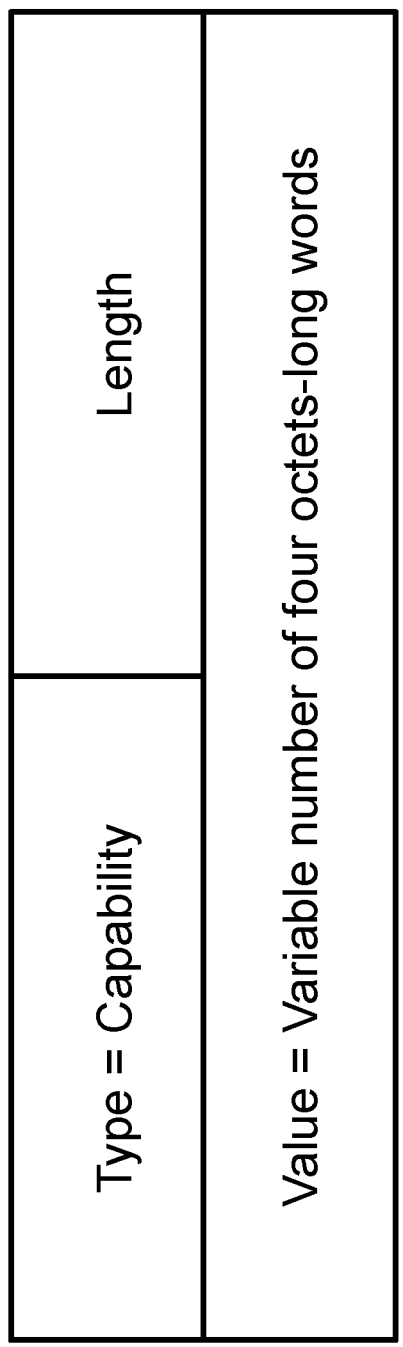
FIG. 10 shows an exemplary format for a Capability Type-Length-Value (TLV).
Figure 11:
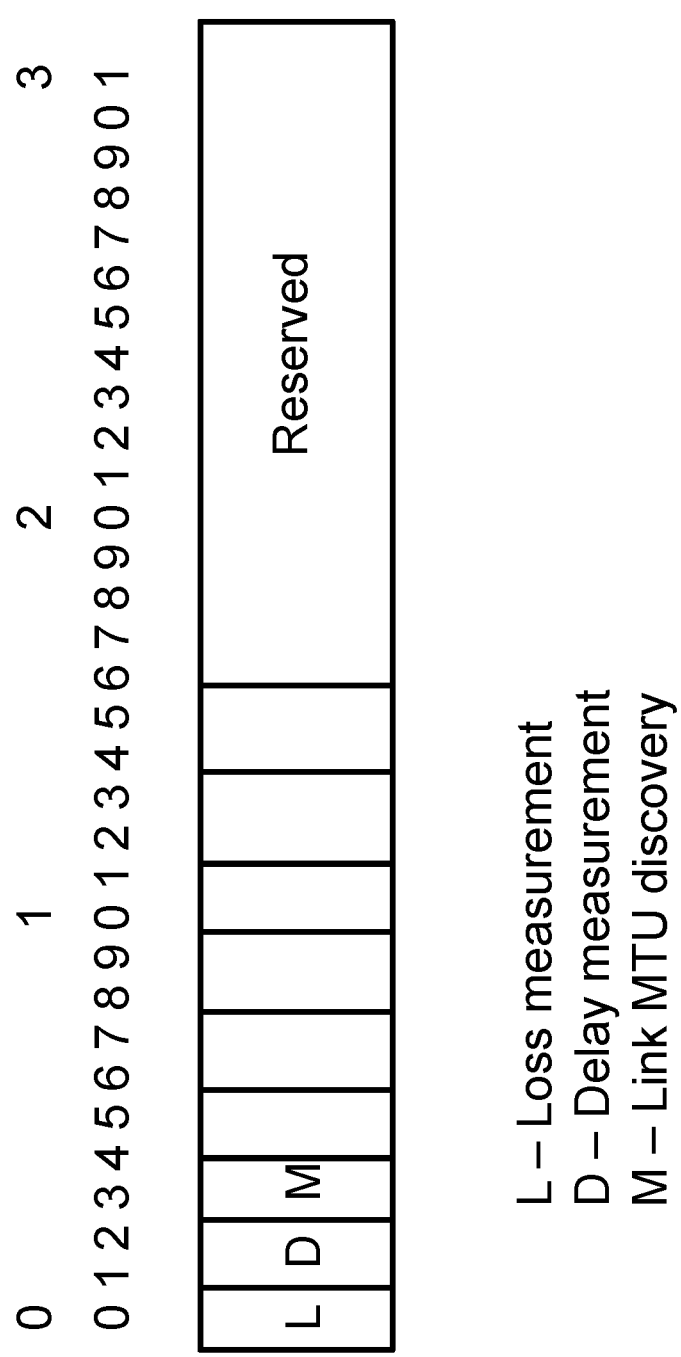
FIG. 11 shows an exemplary format for a Capability word.

In some embodiments, a first BFD control packet included in the first extended BFD control packet generated or sent by the sender device may be different from a second BFD control packet included in the second extended BFD control packet generated or sent by the responder device. In some embodiments, the first payload of the first extended BFD control packet may include the Capability TLV (as shown in FIG. 10) that describes the extended BFD capabilities (using the example format shown in FIG. 11) requested by the sender BFD device. In some embodiments, the second payload of the second extended BFD control packet may include the Capability TLV (as shown in FIG. 10) that includes the extended BFD capabilities (using the example format shown in FIG. 11) supported by the responder BFD device. In an example format shown in FIG. 11, the capabilities included in the type field of FIG. 10 can include a first bit(s) value(s) associated with a first location to indicate loss measurement, a second bit(s) value(s) associated with a second location to indicate a delay measurement, and a third bit(s) value(s) associated with a third location to indicate link MTU discovery. The order of the first, second, and third locations can be changed. For example, the capabilities may be listed in the following order: link MTU discovery (M), loss measurement (L), and delay measurement (D). In some embodiments, the capabilities included in the type field may include only the loss measurement and delay measurement related bit values.

Upon receiving the second extended BFD control packet from the responder device, sender device can determine that the packet it has received has an extended BFD control packet format. Based on this determination, the sender device can determine that the responder device is capable of providing network performance information using one or more additional extended BFD control packet. The sender device can determine that a received packet has an extended BFD control packet format by performing any one or more of the operations 402, 404, and 406 described in FIG. 4.

For example, as shown in operation 402, the sender device may determine that the responder device can receive additional extended BFD control packets to provide network performance information by determining that a total length of the second extended BFD control packet exceeds a sum of a length of a header of the second extended BFD control packet and a length of the second BFD control packet included in the second extended BFD control packet. The total length and the length of the header can be obtained from the IP header information (e.g., Total Length field), and the length of the second BFD control packet can be obtained from the length field of the second BFD control packet (as described in FIG. 1).

At operation 404, the sender device may determine that the responder device can receive additional extended BFD control packets to provide network performance information by determining that the second extended BFD control packet includes the final flag value. At operation 406, the sender device may determine that the responder device can receive additional extended BFD control packets to provide network performance information by determining that the second extended BFD control packet includes the identifier associated with the responder (e.g., by determining that guard word is the same as responder device's word). Operations 402, 404, or 406 may be performed in any order. In some embodiments, operation 406 may be performed after operation 402 and/or operation 404.

If the sender device determines that the total length of a received packet is greater than the sum of the two lengths described in operation 402, that the final flag in the received packet is set as described in operation 404, and that the guard word in the received packet is the same as responder device's word, then the sender device can determine at operation 408 that the responder device can support the use of one or more extended BFD control packets. The precise network capabilities, such as collection of the performance information or measuring any performance metric (e.g., packet loss and/or packet delay) can be determined by the sender device in response to receiving from the responder device information in an extended BFD control packet's Capabilities TLV (as shown in FIG. 10).

However, if the sender device determines that the total length of the received packet is not greater than the sum of the two lengths described in operation 402, or that the final flag in the received packet is not set as described in operation 404, or that the guard word in the received packet is not the same as responder device's word, then the sender device can determine at operation 410 that the responder device does not support the use of extended BFD control packet.

In some embodiments, if the responder device does not support the use of the extended BFD Control packet, it may respond with the regular BFD Control packet with a Final flag set as described in FIG. 1, or the responder device may not respond at all to the sender device. In some embodiments, if the sender device determines that it has received a regular BFD control packet with a Final flag set, then the sender device can determine or conclude that the responder device does not support the use of the extended BFD Control packet. In some embodiments, if the sender device determines that its wait timer has expired without having received an extended BFD control packet from the responder device, then the sender device can determine or conclude that the responder device does not support the use of the extended BFD Control packet. The sender device may start the wait timer when it sends the extended BFD control packet to the responder device. If the responder device does not support the use of the extended BFD Control packets, then the sender device may use only the regular BFD Control packets and may not measure performance using the extended BFD control packets.

If the sender device determines that the responder device supports the extended BFD control packets, then the sender device may use the extended BFD control packets and the regular BFD control packets in any combination. The use of the extended BFD control packet enables the sender device and/or responder device to perform unidirectional and bidirectional measurements of packet loss and packet delay on the path between the two devices operating in a BFD session. Bidirectional measurements may be used to measure one-way and round-trip loss and delay. To generate sufficient data flow in SAT, BFD session may use the extended BFD control packets. For example, the payload part of each extended BFD control packet generated by a sender device can include the Loss Measurement TLV and the Delay Measurement TLV. The message formats for Loss Measurement and Delay Measurement are described in FIGS. 8A and 8B, respectively, and in IETF RFC 6374. The loss measurement and delay measurement TLVs have Type and Length fields and the format of Value as displayed in FIGS. 8A and 8B, respectively. These message formats may be used as Loss Measurement TLV and Delay Measurement TLV.

Figure 8A:
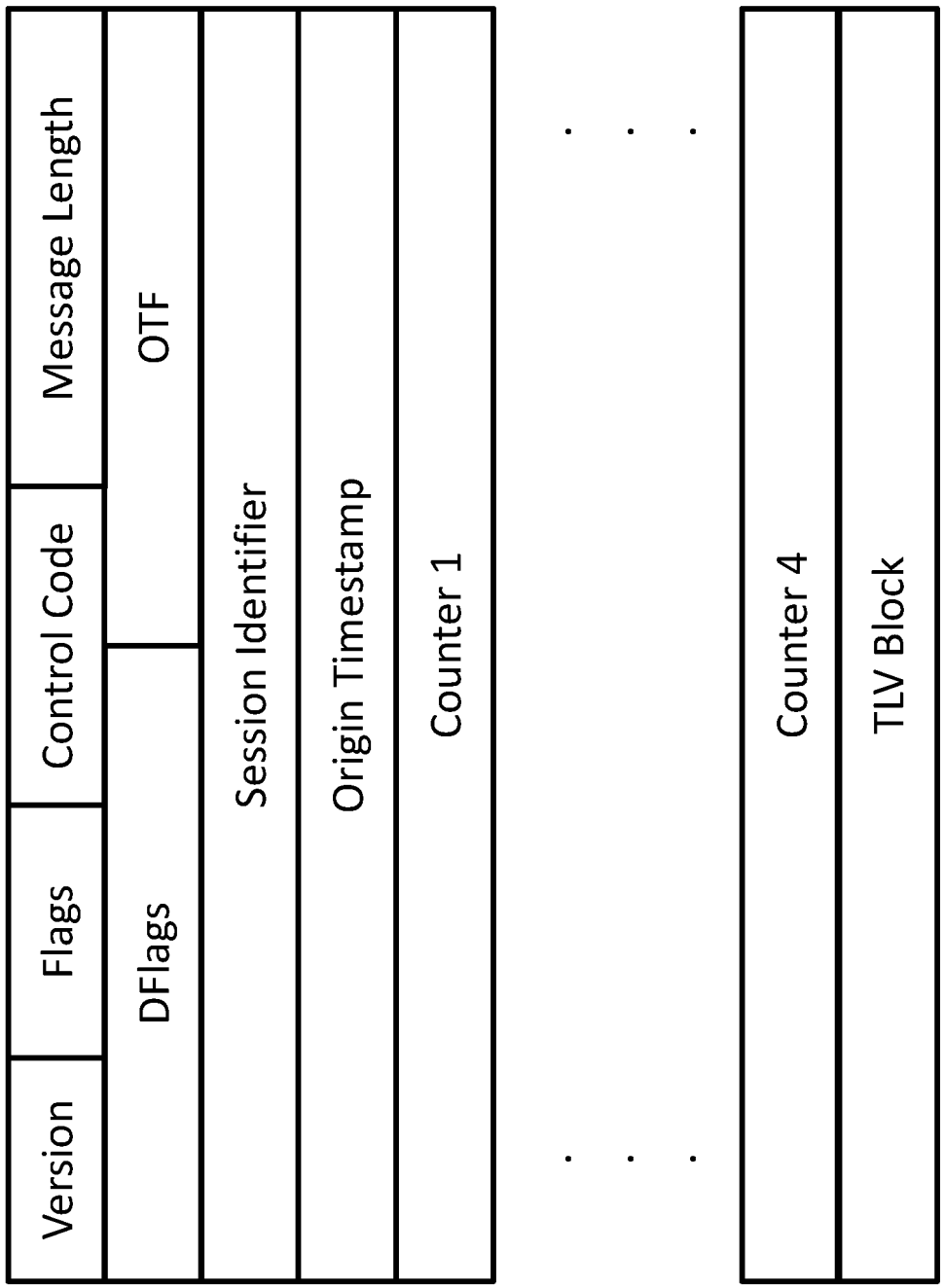
FIG. 8A shows an example of some of the fields of a message format for a packet loss measurement.

FIG. 8A shows an example of some of the fields of a message format for a packet loss measurement. The Version field indicates a protocol version. The Flags field describes the message control flags. The Control Code provides a code identifying the query or response type. The message length is the total length of the packet loss measurement message in bytes. The Data Format Flags (DFlags) are flags specifying the format of message data. The Origin Timestamp Format (OTF) field is the format of the Origin Timestamp field. The Session Identifier field is set arbitrarily by the sender device or querier. The Origin Timestamp includes 64-bit field for query message transmission timestamp. The Counter 1-4 field includes a 64-bit fields for loss measurement counter values. The TLV block can include the Type-Length-Value fields.

Figure 8B:
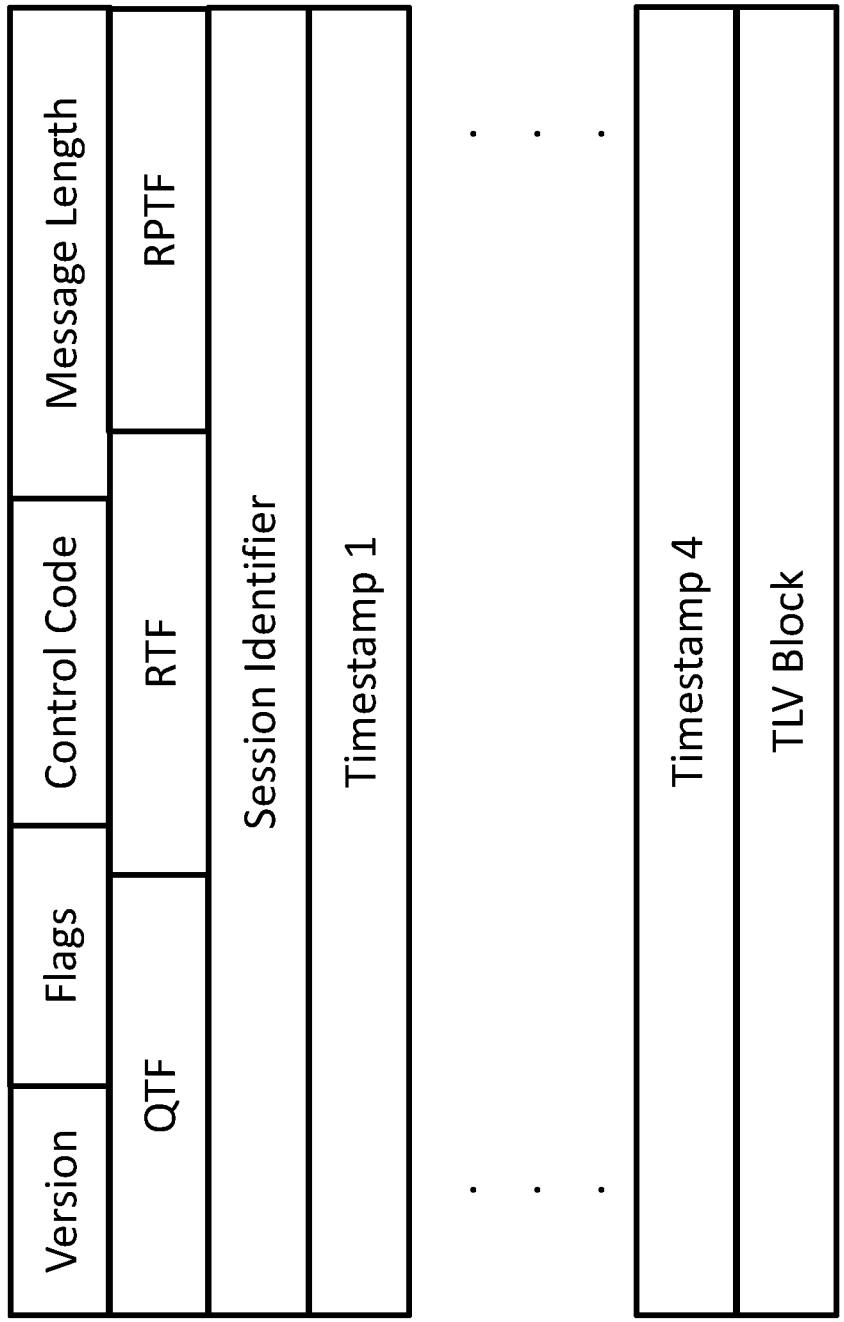
FIG. 8B shows an example of some of the fields of a message format for a delay measurement.

FIG. 8B shows an example of some of the fields of a message format for a delay measurement. The version field indicates a protocol version. The Flags field describes the message control flags. The Control Code provides a code identifying the query or response type. The message length is the total length of the delay measurement message in bytes. The QTF field is the sender's (or querier) timestamp format, the RTF field is the responder timestamp format, and the RPTF field is the responder's preferred timestamp format. The Session Identifier is an identifier set arbitrarily by the sender. Timestamp 1-4 includes 64-bit timestamp values. The TLV block can include the Type-Length-Value fields.

Figure 8C:
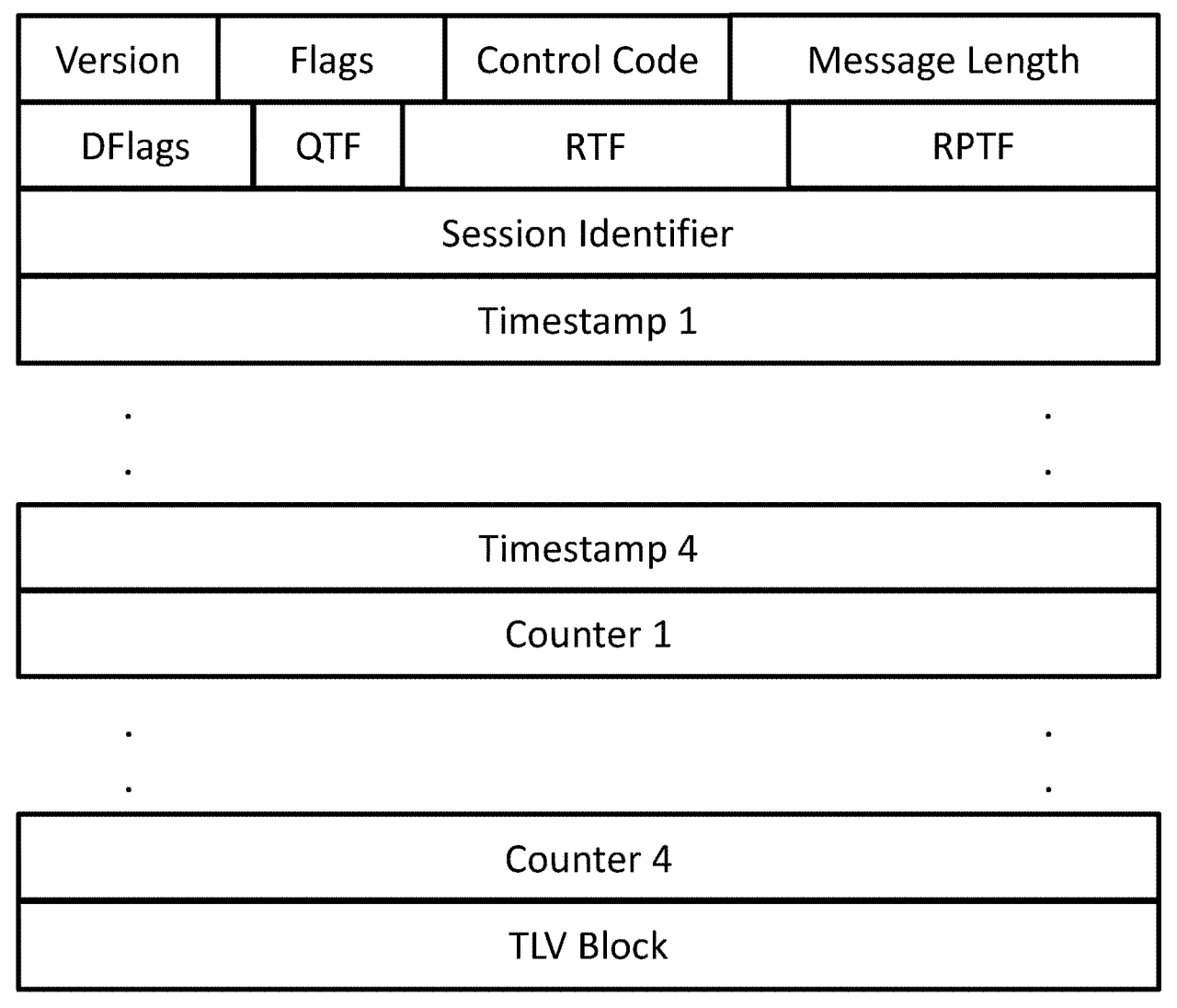

FIG. 8C shows an example of some of the fields of a combined message format for a packet loss and delay measurements. Thus, message format of FIG. 8C can be considered a concatenation of the message formats of FIG. 8A and FIG. 8B. As the message format is used for extended BFD TLV, the fields are represented as TLVs with distinctive types—Loss Measurement and Delay Measurement. The description of the various fields for the combined message are the same as those provided for the fields shown in FIGS. 8A and 8B.

In some embodiments, a sender device may request a responder device to perform a one-way packet loss and delay related measurements. In such embodiments, a sender device can periodically transmit the extended BFD control packets after the sender device determines that the BFD session is in the Up state. The extended BFD control packets may include BFD control packets with a clear Poll value (e.g., a value in the Poll field is zero) and the sender's guard word. In such extended BFD control packets, a Sequence Number included in the Loss Measurement TLV should be monotonically increasing to allow the responder device to detect a loss of an extended BFD control packet. Furthermore, in such extended BFD control packets, the timestamp in the Delay Measurement TLV is the value of the wall clock at the moment when the sender device transmits the extended BFD control packets. It is recommended to use the truncated PTPv2 format as described in IEEE Standard 1588-2008 at least because the collection and the use of timestamps should be separated from the format of the timestamps. Timestamps allow to calculate one-way and round-trip delay. Since different formats provide different representation of a wall clock value, these representations can be normalized by using the information in QTF and RTF fields (shown in FIG. 8B) that reflect the format of timestamp used by the sender and responder devices. As result, timestamps in different formats can be used to calculate delay. Padding TLV of variable length may follow the Delay Measurement TLV. The responder device can record the time(s) it receives the extended BFD control packet(s), calculate running packet loss, packet delay, and inter-packet delay variation. In this mode, unidirectional packet loss and packet delay can be measured.

To retrieve the performance metrics values obtained by the responder device as described above, the sender device can transmit another extended BFD control packet with the empty Query TLV, a Poll flag that is set to a pre-determined value (e.g., 1), and the sender device's guard word in the guard word field. The responder device can respond to the sender device by generating another extended BFD control packet that includes the Query TLV filled with the metrics such as packet loss, packet delay, and inter-packet delay variation, and that includes the Final flag set and the responder device's guard word in the guard word field.

In some other embodiment, a sender device may perform the bidirectional measurement by using a Poll sequence. The sender can generate and/or send a first extended BFD control packet that can include the BFD control packet, sender device's guard word, Loss Measurement TLV followed by the Delay Measurement TLV. The BFD control packet in the first extended BFD control packet can include a poll value for the Poll flag that is set to a pre-determined value (e.g., 1). The responder device uses the received first extended BFD control packet to record its sequence number and the value of the clock when the first extended BFD control packet is received by the responder device and transmitted by the sender device. The responder device generates a second extended BFD control packet that includes sequence number and the value of the clock when the first extended BFD control packet is received by the responder device and transmitted by the sender device. The second extended BFD control packet includes the responder's guard word and a Final flag set. The responder device sends the second extended BFD control packet to the sender device that records the value of the wall clock it receives the second extended BFD control packet, and that calculates one-way and round-trip packet loss, packet delay and inter-packet delay variation.

Figure 12:
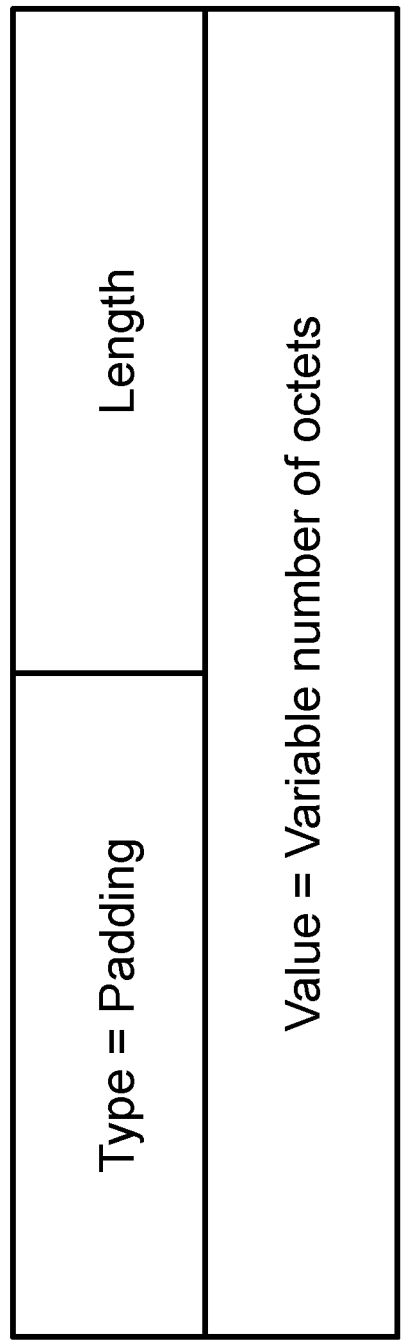
FIG. 12 shows an exemplary format for a Padding TLV.

In some embodiment, the extended BFD Control packet may be used in conjunction with BFD Poll sequence to measure link maximum transmission unit (MTU). The sender device generates and/or sends extended BFD packet with TLV associated with a padding technique (as shown in FIG. 12) and a poll value that indicates that the Poll flag is set. By using the padding technique, a first number of octets of "padding" (i.e., the value field of the TLV in FIG. 12) can be calculated by the sender device so that the length of the IP packet that contains the extended BFD control message is close to or equal to the expected value of link MTU. If the sender device receives a valid extended BFD packet with Final flag set then the sender can add to the first number of octets a pre-determined number of octets in the value field for padding (as shown in FIG. 12) of another extended BFD control packet and transmit such a packet with Poll flag set. Such sequence can be repeated until the sender device does not receive an extended BFD control packet with the Final flag set from the responder device. When the responder device does not respond with an extended BFD control packet with a Final flag set, this concludes discovery of link MTU and the value for the link MTU is the length of the last extended BFD control IP packet that is received by the sender device with the Final flag set. In an example implementation, a responder device may not respond to the sender device if the responder device determines that the received extended BFD control packet is erroneous or corrupted and may drop it. In case the sender device has not received extended BFD packet with the Final flag set in response to the first packet, the sender device can decrease a number of octets in the Padding field to or by a pre-defined value. The sender device can transmit that extended BFD packet with the Poll flag set.

The term device used in this patent document can include a router, a switch, a server, any network equipment, or any equipment that performs a networking role (e.g., a network function that may be performed by a server).

Figure 5:
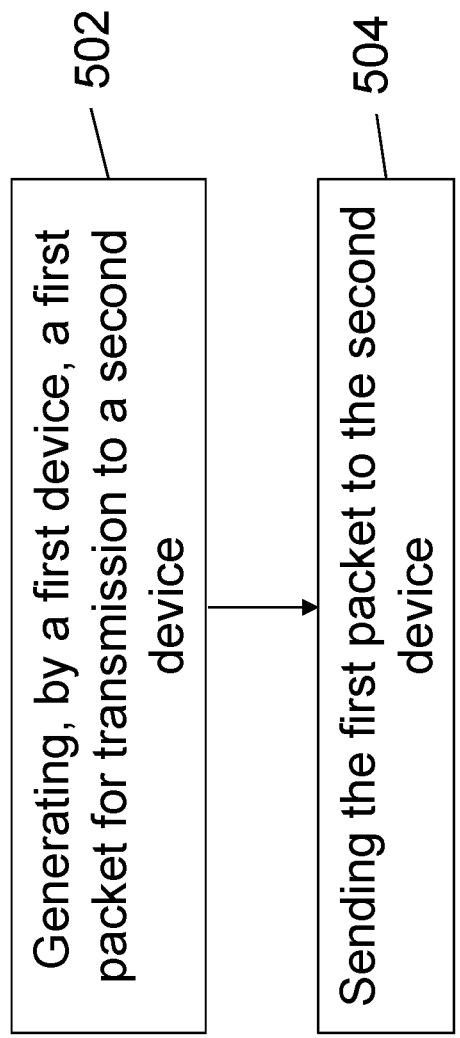
FIG. 5 shows an exemplary flowchart for generating and sending an extended BFD control packet.

FIG. 5 shows an exemplary flowchart for generating and sending an extended BFD control packet. At the generating operation 502, a first device (e.g., a sender device) generates a first packet for transmission to a second device (e.g., a responder device), where the second device is configured to provide network performance information. The first packet includes: a first control message including a first bi-directional forwarding detection (BFD) session information, where the first control message includes a poll value that indicates that the first device is expecting to receive a packet from the second device, a first identifier associated with the first device, and a first payload part. At the sending operation 504, the first device sends the first packet to the second device.

In some embodiments, the method further includes receiving, by the first device after sending the first packet, a second packet from the second device, where the second packet includes: a second control message including a second BFD session information, where the second control message includes a final flag value that indicates that the second packet is sent in response to the first packet, a second identifier associated with the second device, and a second payload part; and determining, after receiving the second packet, that the second device is configured to provide network performance information using one or more additional packets that belong to a packet type comprising the first and second packets.

In some embodiments, the determining that the second device is configured to provide network performance information using one or more additional packets comprises: determining that a first length of the second packet exceeds a sum of a second length of a header of the second packet and a third length of the second control message; or determining that the second packet includes the final flag value; or determining that the second packet includes the second identifier. In some embodiments, a length of each of the first identifier and the second identifier is four octets. In some embodiments, the first identifier is a first pre-determined value, and where the second identifier is a second pre-determined value.

In some embodiments, the method further includes sending, by the first device to the second device and after receiving the second packet, a third packet that includes a third control message including a third BFD session information, where the third control message includes a second poll value, the first identifier, and a third payload part, where the third payload part includes information to request a packet loss measurement and a delay measurement to be performed by the second device; sending, by the first device to the second device, a fourth packet that includes: the first control message, the first identifier, and a fourth payload part, where the fourth payload part includes a query to obtain the packet loss measurement and the delay measurement; and receiving, by the first device and after sending the third and fourth packets, a fifth packet from the second device, where the fifth packet includes: the second control message, the second identifier, and a fifth payload part, where the fifth payload part includes measurement values associated with packet loss, one-way packet delay, and inter-packet delay variation.

In some embodiments, the method further includes sending, by the first device to the second device and after receiving the second packet, a third packet that includes: the first control message, the first identifier, and a third payload part, where the third payload part includes the poll value, and where the third payload part includes information to request a packet loss measurement and a delay measurement to be performed by the second device; receiving, by the first device and after sending the third packet, a fourth packet from the second device, where the fourth packet includes: the second control message, the second identifier, and a fourth payload part, where the fourth payload part includes a first time when the second device receives the third packet and a second time when the second device transmits the fourth message; and determining, by the first device and based on the fourth packet, measurement values associated with round-trip packet loss, packet loss, one-way packet delay, and inter-packet delay variation.

In some embodiments, the first payload part, the second payload part, the third payload part, the fourth payload part, or the fifth payload part are formatted in a type-length-value (TLV) format.

In some embodiments, the first payload part is formatted in a type-length-value (TLV) format associated with a padding technique, the first payload part includes a field whose value corresponds to a number of octets, a length of the first packet is equal to a first link maximum transmission unit (MTU) value, the first device, after receiving the second packet, performs: sending to the second device a third packet that includes: the first control message, the first identifier, and a third payload part formatted in the TLV format associated with the padding technique, where the third payload part includes the poll value, and where the third payload part includes a value field that includes a pre-determined number of octets added to the number of octets; and in response to determining an absence of a reception of a packet from the second device after sending the third packet, determining that an actual link MTU value is the first link MTU value.

In some embodiments, the method further includes starting a timer, by the first device, when the first packet is sent; determining an absence of a reception of a second packet from the second device before an expiration of the timer, where the second packet belongs to a packet type comprising the first packet; and determining, after the determining of the absence of the second packet, that the second device is unable to provide network performance information using one or more additional packets that belong to the packet type.

Figure 6:
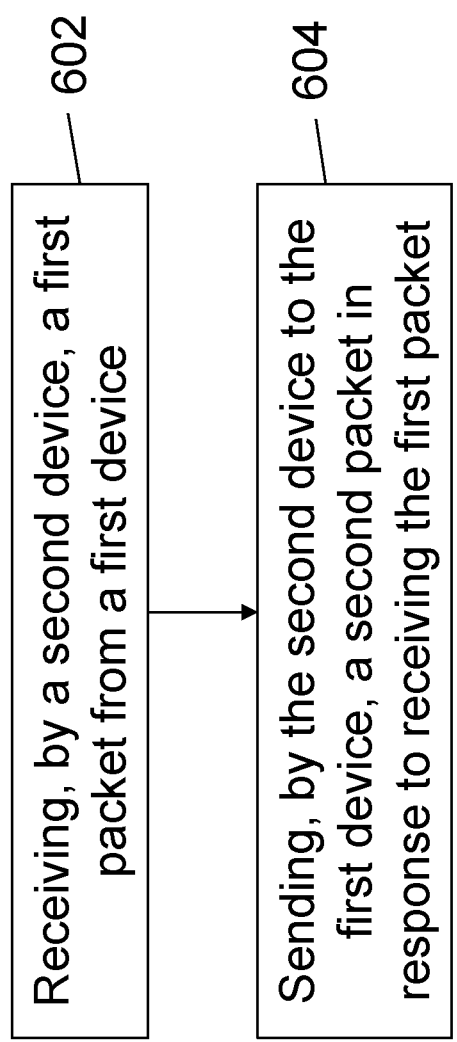
FIG. 6 shows an exemplary flowchart for receiving and processing an extended BFD control packet.

FIG. 6 shows an exemplary flowchart for receiving and processing an extended BFD control packet. At the receiving operation 602, a second device (e.g., a responder device) receives a first packet from a first device (e.g., a sender device), where the second device is configured to provide network performance information. The first packet includes: a first control message including a first bi-directional forwarding detection (BFD) session information, where the first control message includes a poll value that indicates that the first device is expecting to receive a packet from the second device, a first identifier associated with the first device, and a first payload part. At the sending operation 604, the second device sends to the first device a second packet in response to receiving the first packet, where the second packet includes: a second control message including a second BFD session information, where the second control message includes a final flag value that indicates that the second packet is sent in response to the first packet, a second identifier associated with the second device, and a second payload part.

In some embodiments, a length of each of the first identifier and the second identifier is four octets. In some embodiments, the first identifier is a first pre-determined value, and where the second identifier is a second pre-determined value.

In some embodiments, the method further includes receiving, by the second device from the first device and after sending the second packet, a third packet that includes: a third control message including a third BFD session information, where the third control message includes a second poll value, the first identifier, and a third payload part, where the third payload part includes information to request a packet loss measurement and a delay measurement to be performed by the second device; receiving, by the second device from the first device, a fourth packet that includes: the first control message, the first identifier, and a fourth payload part, where the fourth payload part includes a query to obtain the packet loss measurement and the delay measurement; and sending, by the second device to the first device and after receiving the third and fourth packet, a fifth packet, where the fifth packet includes: the second control message, the second identifier, and a fifth payload part, where the fifth payload part includes measurement values associated with packet loss, one-way packet delay, and inter-packet delay variation.

In some embodiments, the method further includes receiving, by the second device from the first device and after sending the second packet, a third packet that includes: the first control message, the first identifier, and a third payload part, where the third payload part includes the poll value, and where the third payload part includes information to request a packet loss measurement and a delay measurement to be performed by the second device; sending, by the second device to the first device and after receiving the third packet, a fourth packet, where the fourth packet includes: the second control message, the second identifier, and a fourth payload part, where the fourth payload part includes a first time when the second device receives the third packet and a second time when the second device transmits the fourth message.

In some embodiments, the first payload part, the second payload part, the third payload part, the fourth payload part, or the fifth payload part are formatted in a type-length-value (TLV) format.

In some embodiments, the first payload part is formatted in a type-length-value (TLV) format associated with a padding technique, the first payload part includes a field whose value corresponds to a number of octets, a length of the first packet is equal to a first link maximum transmission unit (MTU) value, the second device, after sending the second packet, performs: receiving from the first device a third packet that includes: the first control message, the first identifier, and a third payload part formatted in the TLV format associated with the padding technique, where the third payload part includes the poll value, and where the third payload part includes a value field that includes a pre-determined number of octets added to the number of octets; and determining, by the second device, a lack of transmission of another packet to the first device in response to determining that the third packet is erroneous or corrupted.

Figure 7:
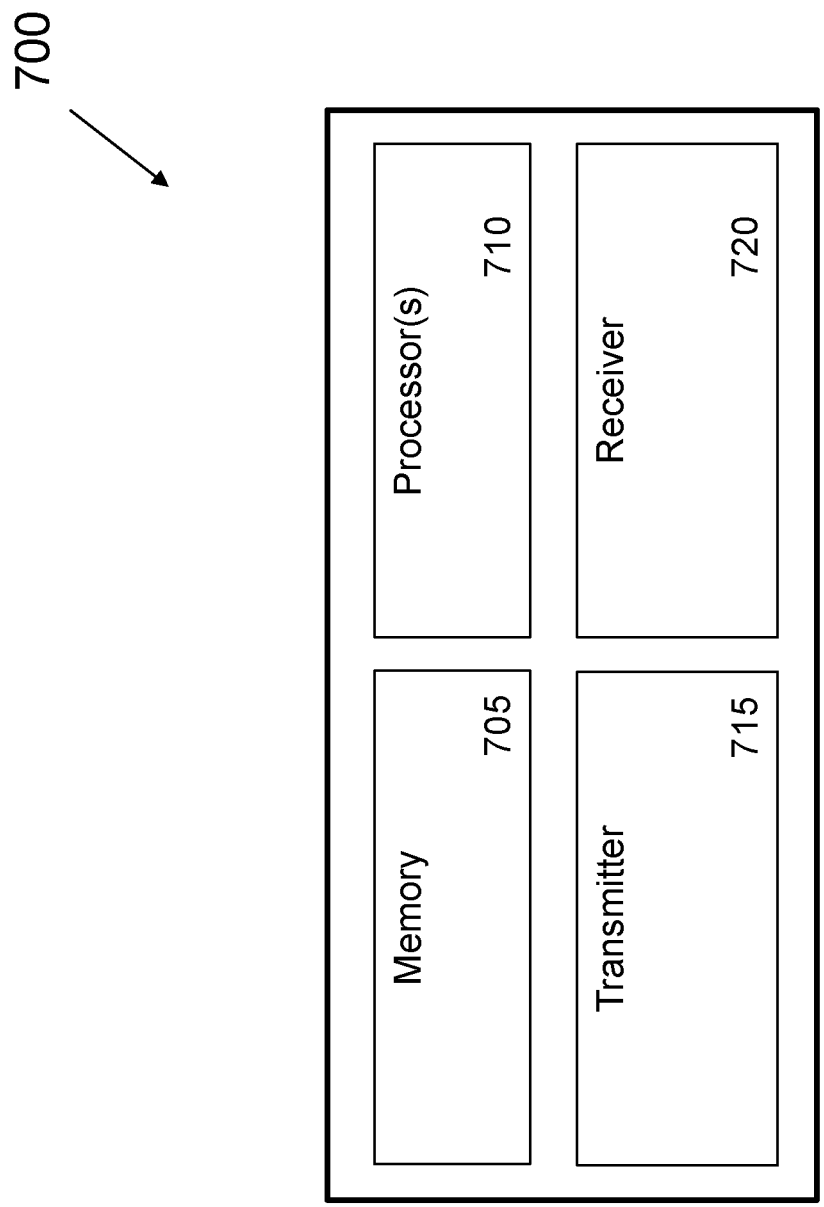
FIG. 7 shows an exemplary block diagram of a hardware platform that may be a part of a device.

FIG. 7 shows an exemplary block diagram of a hardware platform 700 that may be a part of a device (e.g., sender device or responder device). The hardware platform 700 includes at least one processor 710 and a memory 705 having instructions stored thereupon. The instructions upon execution by the processor 710 configure the hardware platform 700 to perform the operations described in FIGS. 1 to 6, 8A to 9, and in the various embodiments described in this patent document. The transmitter 715 transmits or sends information or data to another device. For example, a device's transmitter can send an extended BFD control packet to another device. The receiver 720 receives information or data transmitted or sent by another node. For example, a device's receiver can receive an extended BFD control packet from another device.

Figure 9:
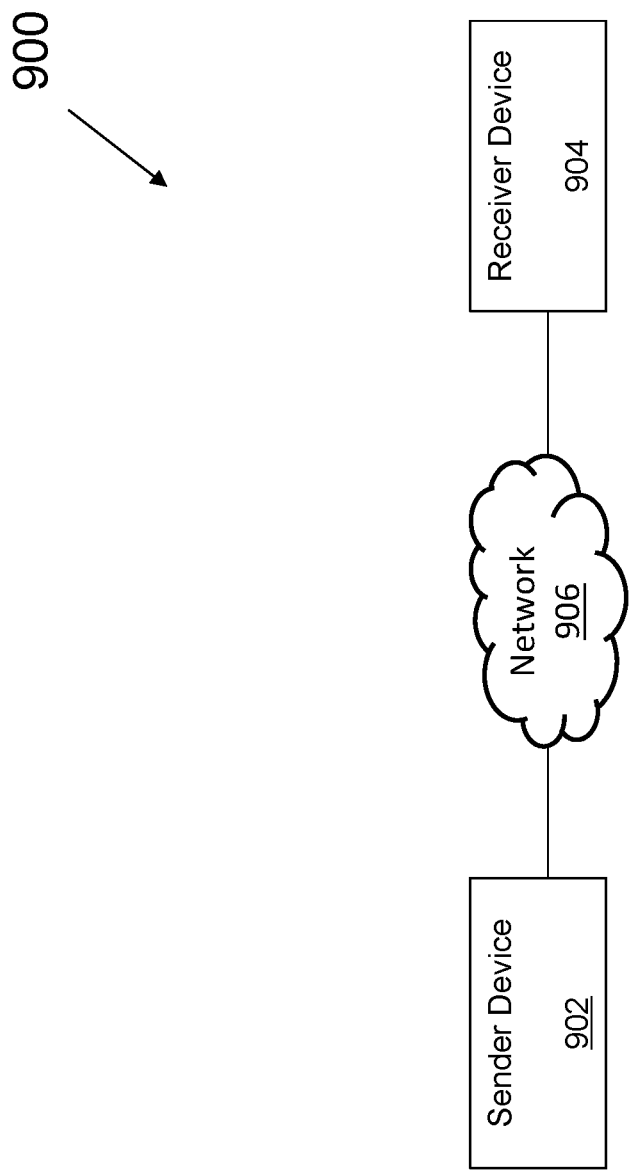
FIG. 9 shows an example of a system for generating or using the extended BFD control packet.

FIG. 9 shows an example of a system for generating or using the extended BFD control packet. The sender device 902 and the responder device 904 can communicate with each other via a network 906, such as the Internet. The sender and responder devices 902, 904 can be a part of a network 900 that may include additional sender and/or responder devices. The sender device 902 and the responder device 904 may perform the operations described in this patent document for the sender device and responder device, respectively.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A packet communication method, comprising:
generating, by a first device, a first packet for transmission to a second device, wherein the second device is configured to provide network performance information, wherein the first packet includes:
  a first control message including a first bi-directional forwarding detection (BFD) session information, wherein the first control message includes a poll value that indicates that the first device is expecting to receive a packet from the second device,
  a first identifier associated with the first device, and
  a first payload part;
sending the first packet to the second device;
receiving, by the first device after sending the first packet, a second packet from the second device, wherein the second packet includes:
  a second control message including a second BFD session information, wherein the second control message includes a final flag value that indicates that the second packet is sent in response to the first packet,
  a second identifier associated with the second device, and
  a second payload part; and
determining, after receiving the second packet, that the second device is configured to provide network performance information using one or more additional packets that belong to a packet type comprising the first and second packets;
sending, by the first device to the second device and after receiving the second packet, a third packet that includes:
  a third control message including a third BFD session information, wherein the third control message includes a second poll value,
  the first identifier, and
  a third payload part, wherein the third payload part includes information to request a packet loss measurement and a delay measurement to be performed by the second device:
sending, by the first device to the second device, a fourth packet that includes:
  the first control message,
  the first identifier, and
  a fourth payload part, wherein the fourth payload part includes a query to obtain the packet loss measurement and the delay measurement and
receiving, by the first device and after sending the third and fourth packets, a fifth packet from the second device, wherein the fifth packet includes:
  the second control message,
  the second identifier, and
  a fifth payload part, wherein the fifth payload part includes measurement values associated with packet loss, one-way packet delay, and inter-packet delay variation.

2. The method of claim 1, wherein the determining that the second device is configured to provide network performance information using one or more additional packets comprises determining that a first length of the second packet exceeds a sum of a second length of a header of the second packet and a third length of the second control message.

3. The method of claim 1, further comprising:
sending, by the first device to the second device and after receiving the second packet, a sixth packet that includes:
  the first control message,
  the first identifier, and
  a sixth payload part, wherein the sixth payload part includes the poll value, and wherein the sixth payload part includes information to request a packet loss measurement and a delay measurement to be performed by the second device;
receiving, by the first device and after sending the sixth packet, a seventh packet from the second device, wherein the seventh packet includes:
  the second control message,
  the second identifier, and
  a seventh payload part, wherein the seventh payload part includes a first time when the second device receives the sixth packet and a second time when the second device transmits a fourth message; and
determining, by the first device and based on the seventh packet, measurement values associated with round-trip packet loss, packet loss, one-way packet delay, and inter- packet delay variation.

4. The method of claim 1,
wherein the first payload part is formatted in a type-length-value (TLV) format associated with a padding technique,
wherein the first payload part includes a field whose value corresponds to a number of octets,
wherein a length of the first packet is equal to a first link maximum transmission unit (MTU) value,
wherein the first device, after receiving the second packet, performs:
  sending to the second device a sixth packet that includes:
    the first control message,
    the first identifier, and
    a sixth payload part formatted in the TLV format associated with the padding technique, wherein the sixth payload part includes the poll value, and wherein the sixth payload part includes a value field that includes a pre-determined number of octets added to the number of octets; and
  in response to determining an absence of a reception of a packet from the second device after sending the sixth packet, determining that an actual link MTU value is the first link MTU value.

5. The method of claim 1, further comprising:
starting a timer, by the first device, when the first packet is sent;
determining an absence of a reception of a one packet from the second device before an expiration of the timer, wherein the one packet belongs to a packet type comprising the first packet; and
determining, after the determining of the absence of the one packet, that the second device is unable to provide network performance information using one or more additional packets that belong to the packet type.

6. The method of claim 1, wherein the determining that the second device is configured to provide network performance information using one or more additional packets comprises determining that the second packet includes the final flag value.

7. The method of claim 1, wherein the determining that the second device is configured to provide network performance information using one or more additional packets comprises determining that the second packet includes the second identifier.

8. A packet communication method, comprising:
receiving, by a second device, a first packet from a first device, wherein the second device is configured to provide network performance information, wherein the first packet includes:
  a first control message including a first bi-directional forwarding detection (BFD) session information, wherein the first control message includes a poll value that indicates that the first device is expecting to receive a packet from the second device,
  a first identifier associated with the first device, and
  a first payload part; 0 sending, by the second device to the first device, a second packet in response to receiving the first packet, wherein the second packet includes:
  a second control message including a second BFD session information, wherein the second control message includes a final flag value that indicates that the second packet is sent in response to the first packet,
  a second identifier associated with the second device, and
  a second payload part; and receiving, by the second device from the first device and after sending the second packet,
a third packet that includes:
  a third control message including a third BFD session information, wherein the third control message includes a second poll value,
  the first identifier, and
  a third payload part, wherein the third payload part includes information to request a packet loss measurement and a delay measurement to be performed by the second device:
receiving, by the second device from the first device, a fourth packet that includes:
  the first control message,
  the first identifier, and
  a fourth payload part, wherein the fourth payload part includes a query to obtain the packet loss measurement and the delay measurement and
sending, by the second device to the first device and after receiving the third and fourth packet, a fifth packet, wherein the fifth packet includes:
  the second control message,
  the second identifier, and
  a fifth payload part, wherein the fifth payload part includes measurement values associated with packet loss, one-way packet delay, and inter-packet delay variation.

9. The method of claim 8, further comprising:
receiving, by the second device from the first device and after sending the second packet, a sixth packet that includes:
  the first control message,
  the first identifier, and
  a sixth payload part, wherein the sixth payload part includes the poll value, and wherein the sixth payload part includes information to request a packet loss measurement and a delay measurement to be performed by the second device;
sending, by the second device to the first device and after receiving the sixth packet, a fourth seventh packet, wherein the seventh packet includes:
  the second control message,
  the second identifier, and
  a seventh payload part, wherein the fourth payload part includes a first time when the second device receives the sixth packet and a second time when the second device transmits a fourth message.

10. The method of claim 8,
wherein the first payload part is formatted in a type-length-value (TLV) format associated with a padding technique,
wherein the first payload part includes a field whose value corresponds to a number of octets,
wherein a length of the first packet is equal to a first link maximum transmission unit (MTU) value,
wherein the second device, after sending the second packet, performs:
  receiving from the first device a sixth packet that includes:
    the first control message,
    the first identifier, and
    a sixth payload part formatted in the TLV format associated with the padding technique, wherein the sixth payload part includes the poll value, and wherein the sixth payload part includes a value field that includes a pre-determined number of octets added to the number of octets; and determining, by the second device, a lack of transmission of another packet to the first device in response to determining that the sixth packet is erroneous or corrupted.

11. A first device, comprising a processor configured to implement a method, comprising:
generate a first packet for transmission to a second device, wherein the second device is configured to provide network performance information, wherein the first packet includes:
a first control message including a first bi-directional forwarding detection (BFD) session information, wherein the first control message includes a poll value that indicates that the first device is expecting to receive a packet from the second device,
a first identifier associated with the first device, and
a first payload part;
send the first packet to the second device;
receive, after the first packet is sent, a second packet from the second device, wherein the second packet includes:
a second control message including a second BFD session information, wherein the second control message includes a final flag value that indicates that the second packet is sent in response to the first packet,
a second identifier associated with the second device, and
a second payload part;
determine, after the second packet is received, that the second device is configured to provide network performance information using one or more additional packets that belong to a packet type comprising the first and second packets;
send, to the second device and after the second packet is received, a third packet that includes:
the first control message,
the first identifier, and
a third payload part, wherein the third payload part includes the poll value, and wherein the third payload part includes information to request a packet loss measurement and a delay measurement to be performed by the second device;
receive, after the third packet is sent, a fourth packet from the second device, wherein the fourth packet includes:
the second control message,
the second identifier, and
a fourth payload part, wherein the fourth payload part includes a first time when the second device receives the third packet and a second time when the second device transmits a fourth message; and
determine, based on the fourth packet, measurement values associated with round-trip packet loss, packet loss, one-way packet delay, and inter-packet delay variation.

12. The first device of claim 11, wherein the determine that the second device is configured to provide network performance information using one or more additional packets comprises determine that a first length of the second packet exceeds a sum of a second length of a header of the second packet and a third length of the second control message.

13. The first device of claim 11, wherein the processor is further configured to:
send, to the second device and after the second packet is received, a fifth packet that includes a third control message including a third BFD session information, wherein the third control message includes a second poll value,
the first identifier, and
a fifth payload part, wherein the fifth payload part includes information to request a packet loss measurement and a delay measurement to be performed by the second device;
send, to the second device, a sixth packet that includes:
the first control message,
the first identifier, and
a sixth payload part, wherein the sixth payload part includes a query to obtain the packet loss measurement and the delay measurement; and
receive, after the fifth and sixth packets are sent, a seventh packet from the second device, wherein the seventh packet includes:
the second control message,
the second identifier, and
a seventh payload part, wherein the seventh payload part includes measurement values associated with packet loss, one-way packet delay, and inter-packet delay variation.

14. The first device of claim 11,
wherein the first payload part is formatted in a type-length-value (TLV) format associated with a padding technique,
wherein the first payload part includes a field whose value corresponds to a number of octets,
wherein a length of the first packet is equal to a first link maximum transmission unit (MTU) value,
wherein after the receive the second packet, the processor of the first device is configured to:
send to the second device a fifth packet that includes:
the first control message,
the first identifier, and
a fifth payload part formatted in the TLV format associated with the padding technique, wherein the fifth payload part includes the poll value, and wherein the fifth payload part includes a value field that includes a pre-determined number of octets added to the number of octets; and
in response to a determination of an absence of a reception of a packet from the second device after sending the fifth packet, determine that an actual link MTU value is the first link MTU value.

15. The first device of claim 11, wherein the processor of the first device is further configured to:
start a timer, by the first device, when the first packet is sent;
determine an absence of a reception of one packet from the second device before an expiration of the timer, wherein the one packet belongs to a packet type comprising the first packet; and
determine, after the determine of the absence of the one packet, that the second device is unable to provide network performance information using one or more additional packets that belong to the packet type.

16. The first device of claim 11, wherein the determine that the second device is configured to provide network performance information using one or more additional packets comprises determine that the second packet includes the final flag value.

17. The first device of claim 11, wherein the determine that the second device is configured to provide network performance information using one or more additional packets comprises determine that the second packet includes the second identifier.

18. A second device, comprising a processor configured to implement a method, comprising:
   receive a first packet from a first device, wherein the second device is configured to provide network performance information, wherein the first packet includes:
      a first control message including a first bi-directional forwarding detection (BFD) session information, wherein the first control message includes a poll value that indicates that the first device is expecting to receive a packet from the second device,
      a first identifier associated with the first device, and
      a first payload part;
   send, to the first device, a second packet in response to the first packet being received, wherein the second packet includes:
      a second control message including a second BFD session information, wherein the second control message includes a final flag value that indicates that the second packet is sent in response to the first packet,
      a second identifier associated with the second device, and
      a second payload part
   receive, from the first device and after the second packet is sent, a third packet that includes:
      the first control message,
      the first identifier, and
      a third payload part, wherein the third payload part includes the poll value, and wherein the third payload part includes information to request a packet loss measurement and a delay measurement to be performed by the second device;
   send, to the first device and after the third packet is received, a fourth packet, wherein the fourth packet includes:
      the second control message,
      the second identifier, and
      a fourth payload part, wherein the fourth payload part includes a first time when the second device receives the third packet and a second time when the second device transmits a fourth message.

19. The second device of claim 18, wherein the processor is further configured to:
   receive, from the first device and after the second packet is sent, a fifth packet that includes:
      a third control message including a third BFD session information, wherein the third control message includes a second poll value,
      the first identifier, and
      a fifth payload part, wherein the fifth payload part includes information to request a packet loss measurement and a delay measurement to be performed by the second device;
   receive, from the first device, a sixth packet that includes:
      the first control message,
      the first identifier, and
      a sixth payload part, wherein the sixth payload part includes a query to obtain the packet loss measurement and the delay measurement; and
   send, to the first device and after the fifth and sixth packets are received, a seventh packet, wherein the seventh packet includes:
      the second control message,
      the second identifier, and
      a seventh payload part, wherein the seventh payload part includes measurement values associated with packet loss, one-way packet delay, and inter-packet delay variation.

20. The second device of claim 18,
wherein the first payload part is formatted in a type-length-value (TLV) format associated with a padding technique,
wherein the first payload part includes a field whose value corresponds to a number of octets,
wherein a length of the first packet is equal to a first link maximum transmission unit (MTU) value,
wherein the processor of the second device, after the second packet is sent, is configured to perform:
   receive from the first device a fifth packet that includes:
      the first control message,
      the first identifier, and
      a fifth payload part formatted in the TLV format associated with the padding technique, wherein the fifth payload part includes the poll value, and wherein the fifth payload part includes a value field that includes a pre-determined number of octets added to the number of octets; and
   determine a lack of transmission of another packet to the first device in response to a determination that the fifth packet is erroneous or corrupted.

* * * * *